No. 666,990. Patented Jan. 29, 1901.
H. WIBLE.
RAKE.
(Application filed Oct. 9, 1900.)
(No Model.)
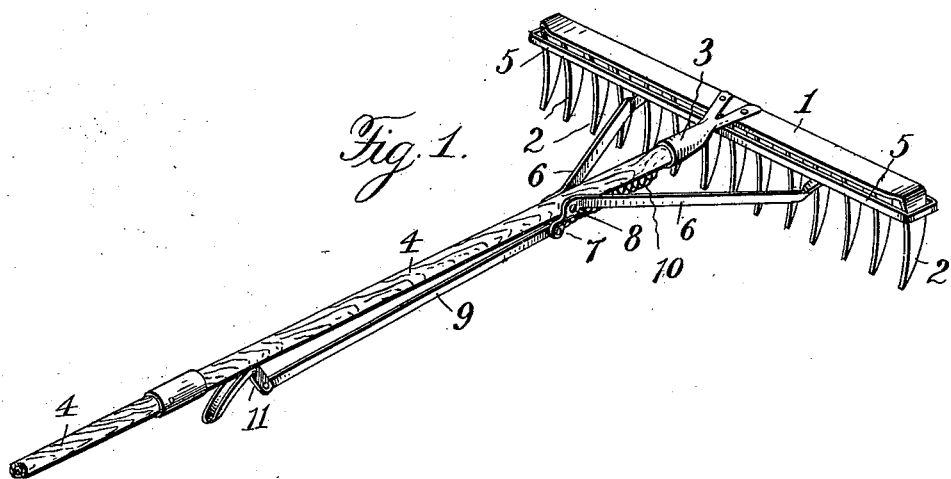
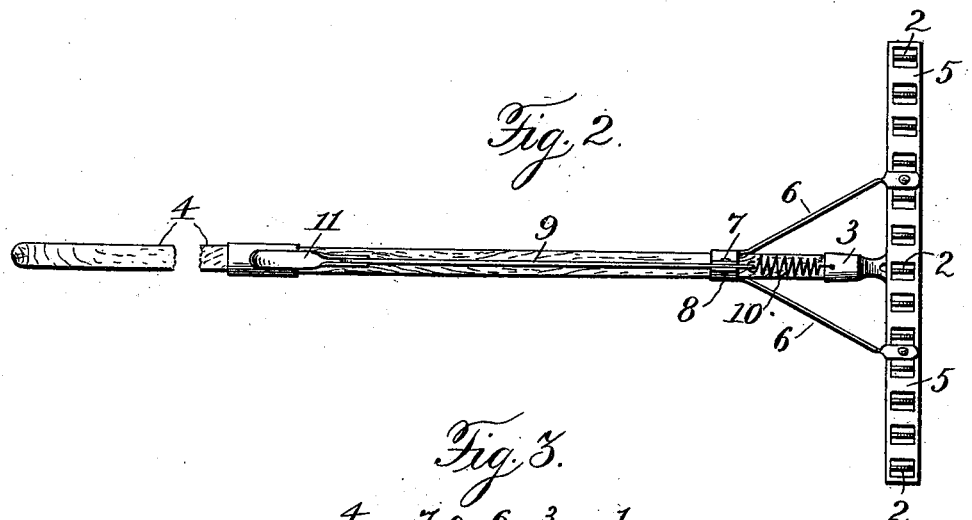
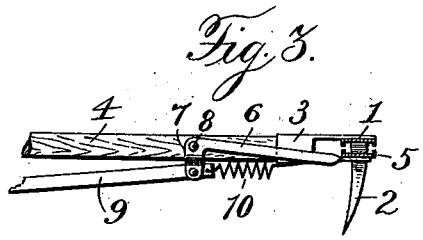
WITNESSES
Jas E Hutchinson
G. F. Downing
INVENTOR
H. Wible
By H. A. Seymour
Attorney

UNITED STATES PATENT OFFICE.

HARRY WIBLE, OF CANAL DOVER, OHIO.

RAKE.

SPECIFICATION forming part of Letters Patent No. 666,990, dated January 29, 1901.

Application filed October 9, 1900. Serial No. 32,533. (No model.)

*To all whom it may concern:*

Be it known that I, HARRY WIBLE, a resident of Canal Dover, in the county of Tuscarawas and State of Ohio, have invented certain new and useful Improvements in Rakes; and I do hereby declare the following to be a full, clear, and exact description of the invention, such as will enable others skilled in the art to which it appertains to make and use the same.

My invention relates to an improved rake, and more particularly to an attachment for rakes, the object of the invention being to provide a rake with improved means for removing trash or other entanglement from the teeth thereof which can be operated by the gardener without stopping the operation of the rake.

With this object in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a bottom plan view of the same, and Fig. 3 is a view of details of construction.

1 represents a rake-head provided with a series of parallel rake-teeth 2, curved on their rear edges in the arc of a circle, as shown. The rake-head 1 has secured thereto a thimble 3, mounted on the end of a handle 4 and secured thereon by any approved means. A plate 5, having, preferably, square openings therein for the reception of the teeth 2, is mounted on the teeth and made with flanges on its ends and front edge. Two bell-crank levers 7 are pivoted at the juncture of their arms to the handle 4 by means of a pin 8. The long arms 6 of said levers are bent outwardly from their pivotal connection with the handle and are secured at their outer ends to the plate 5 at points removed considerable distances from the center of the plate, so that when said levers are operated the plate 5 will be moved uniformly, and thus prevent undue straining or binding of the parts if there should be more trash on the rake at one side of the center of the rake than at the other side, and the ends of the short arms of the levers are curved around the handle and pivotally connected to a rod or link 9. A coiled spring 10 is secured at one end to the end of rod or link 9 and at its other end to the handle 4, so as to normally hold the short arms of the bell-crank levers in a vertical position, and hence hold the plate 5 in its highest position against the head 1. The rod or link 9 projects toward the inner end of the handle 4 and alongside the under face of handle 4 and is connected at its inner end to a bell-crank hand-lever 11, pivotally connected to the under face of the handle for operating the plate 5 to clear the rake-teeth. If the teeth of the rake become choked with trash, the user will operate the hand-lever 11 to force plate 5 down and free the teeth from the trash, and when the hand-lever 11 is released the plate 5 will be forced back to its highest position against the under face of the head by the spring 10 and held thereby in such position until the hand-lever 11 is again operated.

It will be seen that with my improvements the operator can free the rake-teeth from entanglements without stopping the raking operation, thus obviating the necessity of stopping to pick the entanglements from the rake-teeth.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. An attachment for a rake comprising a plate having holes for the passage of the rake-teeth, two bell-crank levers to be pivoted to the rake-handle, the long arms of said levers bent outwardly in opposite directions and secured to the plate at points between the center and ends thereof, a hand-lever and a rod connecting said handle with the short arms of both of said bell-crank levers.

2. The combination with a rake-head and a handle secured thereto, of a movable plate having perforations for the passage of the rake-teeth, bell-crank levers pivoted at respective sides of the handle and having their long arms projecting laterally and outwardly and secured at their outer ends to the perforated plate considerable distances from the longitudinal center thereof, a hand-lever pivoted to the handle, a rod connecting said hand-lever with the short arms of both of said bell-crank levers, and a spring connecting said rod with the handle to maintain the perforated plate normally raised.

3. An attachment for a rake, comprising a plate having holes therein for the passage of the rake-teeth, two bell-crank levers each secured at one end to the plate and adapted to be pivotally connected to opposite sides of a rake-handle, a rod pivotally connected with the ends of both of the other arms of said bell-crank levers, a hand-lever connected to the other end of said rod and adapted to be pivotally connected to a rake-handle and a spring adapted to normally hold the rod and bell-crank levers in position to maintain the plate against the head of the rake.

4. In a rake, the combination with a rake-head having curved teeth thereon and a handle to which the head is secured, of two bell-crank levers pivoted to opposite sides of the handle and having their short arms partially embracing the same, a plate secured to the long arm of each bell-crank lever and having holes for the passage of the rake-teeth, a hand-lever pivoted to the handle some distance from the bell-crank levers, a rod connecting said hand-lever with the short arms of both of said bell-crank levers and a spring secured to the handle and to the rod so as to hold the plate against the head of the rake.

In testimony whereof I have signed this specification in the presence of two subscribing witnesses.

HARRY WIBLE.

Witnesses:
JOHN A. HOSTETLER,
JOS. H. HOSTETLER.